(12) United States Patent (10) Patent No.: US 8,833,787 B2
Zolotov (45) Date of Patent: Sep. 16, 2014

(54) CREATING THE BELLOWS OF A PASSAGE OR SIDE PANEL BETWEEN TWO VEHICLES JOINED IN AN ARTICULATED MANNER

(75) Inventor: Roman Zolotov, Kassel (DE)

(73) Assignee: Hübner GmbH & Co. KG, Kassel (DE)

( * ) Notice: Subject to any disclaimer, the term of this patent is extended or adjusted under 35 U.S.C. 154(b) by 366 days.

(21) Appl. No.: 13/245,006

(22) Filed: Sep. 26, 2011

(65) Prior Publication Data

US 2012/0112432 A1    May 10, 2012

(30) Foreign Application Priority Data

Nov. 18, 2010    (EP) .................................. EP10014721

(51) Int. Cl.
*B61D 17/22*    (2006.01)

(52) U.S. Cl.
USPC ........... 280/403; 105/18; 160/84.04; 428/183

(58) Field of Classification Search
USPC ..................... 280/403; 296/178, 179; 138/21;
105/18–20, 8.1; D23/266, 384;
160/84.01, 84.04; 428/181–184
See application file for complete search history.

(56) References Cited

U.S. PATENT DOCUMENTS

| | | | | | |
|---|---|---|---|---|---|
| 777,285 | A | * | 12/1904 | Fuller | 105/18 |
| 903,893 | A | * | 11/1908 | Schroyer | 105/18 |
| 1,078,757 | A | * | 11/1913 | Whitmore | 105/10 |
| 1,450,007 | A | * | 3/1923 | Pflager | 105/18 |
| 2,408,473 | A | * | 10/1946 | Nelson | 105/20 |
| 4,860,665 | A | * | 8/1989 | Schmidt | 105/18 |
| 5,456,186 | A | | 10/1995 | Hubner | |
| 6,926,344 | B2 | * | 8/2005 | Koch et al. | 296/178 |
| 7,392,748 | B2 | * | 7/2008 | De Antonio et al. | 105/8.1 |
| 2006/0174958 | A1 | * | 8/2006 | Koch | 138/121 |

FOREIGN PATENT DOCUMENTS

| | | |
|---|---|---|
| DE | 4127535 A1 | 2/1993 |
| DE | 19638154 A1 | 3/1998 |
| DE | 19721285 A1 | 11/1998 |
| EP | 1990563 A1 | 11/2008 |
| EP | 2149461 A1 | 2/2010 |
| EP | 2258568 A1 | 12/2010 |
| GB | 2350091 | * 11/2000 |

* cited by examiner

*Primary Examiner* — Anne Marie M. Boehler

(74) *Attorney, Agent, or Firm* — Gifford, Krass, Sprinkle, Anderson & Citkowski, P.C.; Douglas L. Wathen

(57) ABSTRACT

The subject matter of the invention is a bellows of a passage or the side panel between two vehicles joined in an articulated manner, e.g. a railway vehicle or an articulated bus, wherein the design contains numerous adjacent pleats, wherein at least on one side of the numerous pleats there is a corrugation element disposed in a pleat, in each case, wherein the ends of the respective pleats and the corrugation element are connected to one another.

9 Claims, 3 Drawing Sheets

CREATING THE BELLOWS OF A PASSAGE OR SIDE PANEL BETWEEN TWO VEHICLES JOINED IN AN ARTICULATED MANNER

CROSS-REFERENCE TO RELATED APPLICATION

This application claims priority of European Patent Application EP 10 014 721.4-1268 filed Nov. 18, 2010.

FIELD OF THE INVENTION

The invention relates to a bellows of a passage or side panel between two vehicles joined in an articulated manner, e.g. a railway vehicle or an articulated bus, wherein the design includes numerous adjacent pleats.

BACKGROUND OF THE INVENTION

A design of the type specified above is sufficiently known from the prior art. As such, pleated or corrugated bellows as part of a passage between vehicles joined in an articulated manner are known, wherein a bellows of this type is designed in the form of a tunnel, and encompasses the bridge and, where applicable, the joint connecting the two vehicle segments. Pleated or corrugated bellows of this type are used with railway vehicles as well as buses. In particular, with high-speed trains, i.e. with an ICE [trans: InterCity Express train] for example, double walled bellows are incorporated in a passage in order to reduce the noise level as well as to diminish the pressure surges occurring when a train of this type enters a tunnel, for example. These bellows, in which an outer and, separated from the outer bellows, an additional inner corrugated bellows is provided, located at the end surface of the respective vehicle, form both a thermal insulation as well as contributing to noise reduction; they are also capable of diminishing the previously mentioned pressure surges. The rigidity of the bellows is particularly relevant specifically for preventing pressure surges.

Particularly in the field of railway vehicles, it is known to connect carriages to one another only by couplings, wherein a coupling of this type is likewise regarded as an articulated connection in the scope of the invention. With carriages of a railway vehicle of this type, which are joined together with a coupling, it is not abnormal to not connect the carriages to one another with a passage, i.e. with a bridge and a bellows. This means that the vehicle segments or carriages are not connected to one another in such a manner that passage by a person from one carriage to another carriage is enabled, as would be the case if a passage of this type were provided. When the vehicles are joined together with only a coupling, it is, however, still possible to pass from one to the other. This applies in particular when, on the coupling, as is often the case, there is a coupling plate, which is there for the sole purpose of enabling service personnel to step from one carriage to another, or to stand on top of the coupling for inspection purposes. It has been determined, however, that these coupling plates, or respectively, the coupling itself, are used for riding purposes while the train is in motion. This so-called "surfing" has led to numerous accidents.

Furthermore, railway articulated vehicles are known which are joined to one another by means of a passage, wherein the bellows is offset inwards by between 10 and 30 cm between the two vehicle segments. As a result, there is a gap between the edge of the platform and the bellows.

As a result it is possible that, in particular when there are large crowds on the platform, a person could end up in the space between the bellows and the edge of the platform, and in particularly adverse circumstances, fall onto the track bed. It is conceivable in this context, to have a side panel, flush with the outer walls, between the vehicle segments.

It has been discussed elsewhere that bellows in high-speed trains must be capable of compensating for pressure surges as well. In another context, a side panel for covering the lateral space between the bellows and the platform should be rigid enough to prevent people from being able to stick their leg in the space between the bellows and the platform when the side panel of a bellows is bowed inwards. This also applies in the same context to a side panel between two vehicle segments without a passage bellows, placed there in order to prevent "subway surfing."

SUMMARY OF THE INVENTION

The objective of the invention is therefore to produce a design for a bellows, which is distinguished by a high degree of rigidity over the course of its surface.

To attain the objective it is proposed, according to the invention, that at least on one side of the numerous pleats, a corrugation element is disposed in each pleat, wherein the ends of the respective pleat and the corrugation element are connected to one another. This means that the subject matter of the invention is the combination of a pleat with a corrugation element, wherein the corrugation element is a component of each pleat. Both the pleats as well as the corrugation element are produced from a plastic coated reinforcement, e.g. a textile. It has been shown that by means of a combination of this type an increase in rigidity of a side panel produced in this manner, as well as a bellows produced in this manner, can be obtained, without any sacrifices noticed regarding the elasticity of a bellows of this type or the side panel as a result of the combination of pleats and corrugation elements.

As such, it is provided, in particular, that the ends of the pleat and the corrugation element are connected by a frame having a U-shaped cross-section. With a side panel per se, the frame extends only over the course of the height of the side panel; with a bellows, in this context, at least a U-shaped, or an encompassing, bellows frame is provided.

According to a special characteristic of the invention, numerous pleats have a slit on their inner surfaces, i.e. the surface facing the interior of the carriage body, in particular, at least one slit centrally located in the region of the respective pleat crease or pleat spine on the side panel, or centrally located on a side panel, ceiling or floor section of a tunnel-like encompassing bellows. By means of a slit of this type, the expansion width, in particular, is somewhat increased, without contributing any sacrifices to the rigidity. It is also advantageous when not only one such slit is provided but with a side panel as such, aside from a central location of the slit there is also a slit-like design at each end, based on the fact that according to a further characteristic of the invention for increasing the rigidity and also to increase the spring action for the purpose of the compression of the side panel, or the bellows, respectively, the pleat walls of two adjacent pleats are connected in the region of the slit, for example, in that the connection is created by at least one seam, which extends over the length of the pleat. The seam causes not only an increase in the rigidity of the side panel, or a bellows produced entirely in this manner, but also increases the spring action, which is necessary in order that the bellows retracts to its normal state after it has been expanded.

A seam of this type is advantageously provided in a side panel at the top end as well as the bottom end, in order to enable a uniform expansion and retraction of the side panel. applies in principle for the design of a bellows, and at least in the region of each bellows section, a slit of this type with a corresponding seam is disposed over the extent of a U-shaped or tunnel-like encompassing bellows of this type. The incorporation of slits of this type, in particular in the corners of a bellows, results in an increased expansion width in this region, which supports the accommodation of rolling and pitched movements, or from overlapping movements of rolling, pitched and angular motions.

According to a further special characteristic of the invention, the pleat in the passage at the end surface of the carriage body of a vehicle segment is connected to the end surface of the carriage body at at least one of its upright or longitudinal edges and at least one, preferably however, both upright edges of the pleat. From this it is clear that the pleat is not only, for example, connected to the end surface of the vehicle at an upright edge, but rather substantially over the course of the entire surface. This results in a further increase in the rigidity of the bellows or even a solo-side panel, and as a result the inward bowing due to external loads is further reduced. In this context, in some cases, the pleat on the end of a passage is provided with a frame, wherein the bellows or the side panel can be connected to the end surface of the vehicle by means of these frames.

A bellows or side panel produced in the manner according to the invention, as has already been described elsewhere, is particularly stable in the direction perpendicular to the longitudinal axis of the vehicle, wherein it also applies in particular to a bellows produced in this manner that is capable, to a very high degree, of accommodating pressure surges, and that furthermore a side panel as a solo-side panel is also effective in preventing an inward bowing due to the effects of transverse forces.

According to another characteristic of the invention, it is provided that the corrugation elements bow outwards in the same direction as that of the receiving pleats. This measure serves not only to increase the rigidity, but is also space-saving.

BRIEF DESCRIPTION OF THE DRAWINGS

The invention shall be explained in greater detail below based on the illustrations.

DETAILED DESCRIPTION OF THE PRESENT INVENTION

Figure 1:
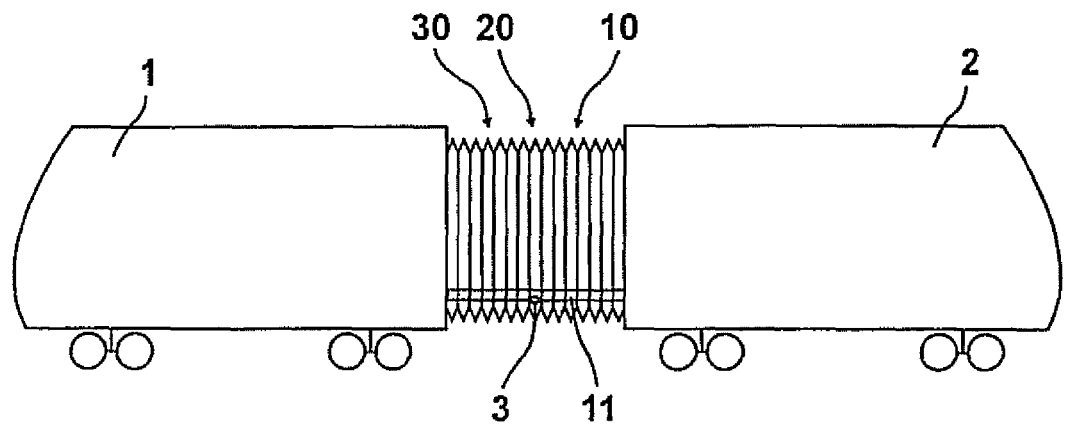
FIG. 1 shows schematically an articulated vehicle with two vehicle segments, connected to one another by a passage.

From the illustration according to FIG. 1, the two vehicle segments 1 and 2 are recognizable as railway vehicles joined in an articulated manner to one another by a coupling 3. The invention comprises, however, not only articulated vehicles of this type, which are joined by means of a coupling, but also those which are joined by means of a joint. The passage, indicated by the numeral 10, is located in the region of the coupling or the joint, comprising at least a bridge or a rotational plate 11, and a side panel 20 or the bellows 30 forming that part of a passage.

The subject matter of the invention is thereby the design for creating the bellows of a passage or a side panel. In this context reference is made to the FIGS. 2-5. FIGS. 2-5 show a side panel, either as a solo-side panel between two vehicle segments 1 and 2 for bridging the space between these two vehicle segments, or the side panel as a part of a complete encompassing tunnel-like bellows. It should be noted that the remaining sections, i.e. the ceiling and floor, may be designed in the same manner as the side panel. Accordingly, reference is made in the following to a side panel, while the corresponding formulation also applies to the design of a bellows, which, in reference to the floor, ceiling and walls, is designed in the same manner. The side panel 20, or the bellows 30, has numerous pleats 21, 31, wherein each pleat 21, 31 has two pleat walls 22, 32, 23, 33. Each pleat 21, 31 accommodates a corrugation element 27, 37 in the middle, wherein the pleats 21, 31 are attached to the corrugation element 27, 37 at their ends (arrow 25) by means of a seam and/or gluing, and additionally, as the case may be, fixed to one another by a U-shaped frame 40. The creases of the corrugation elements 27, 37 point in the same direction as the spines 24, 34 of the pleats 21, 31. In the illustration, the corrugation element runs between two adjacent pleats to the respective seams 29, 30.

Figure 2:
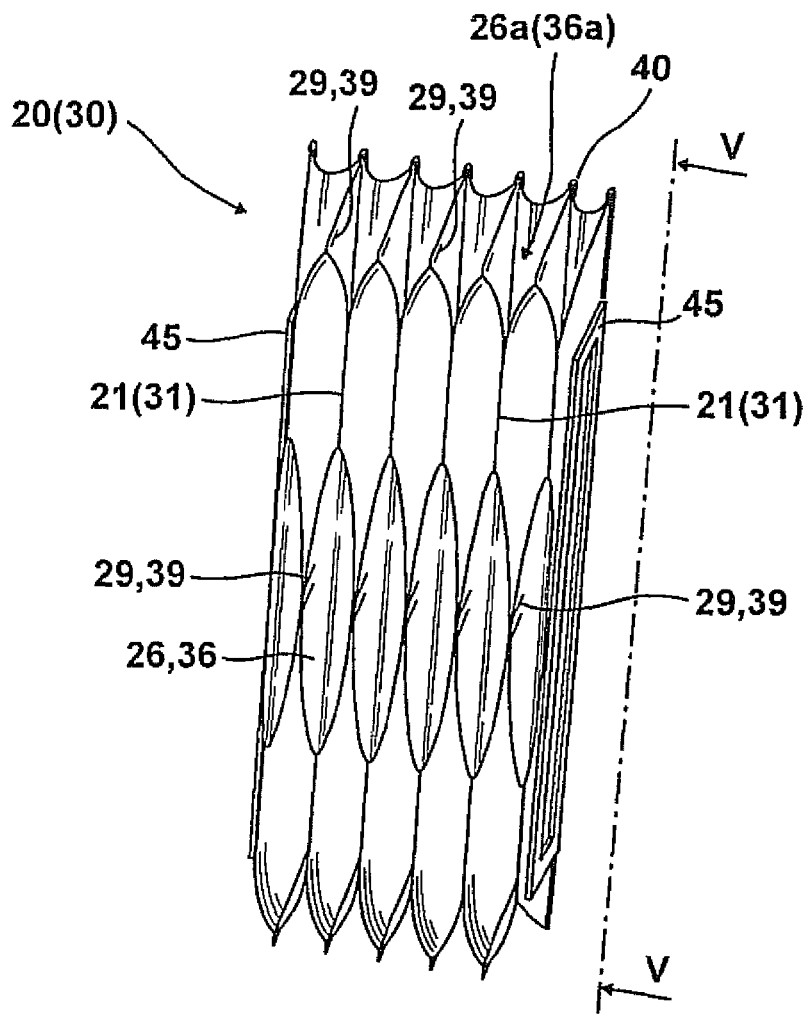
FIG. 2 shows schematically the design according to the invention for creating the bellows of a passage or a side panel in a perspective illustration.
Figure 3:
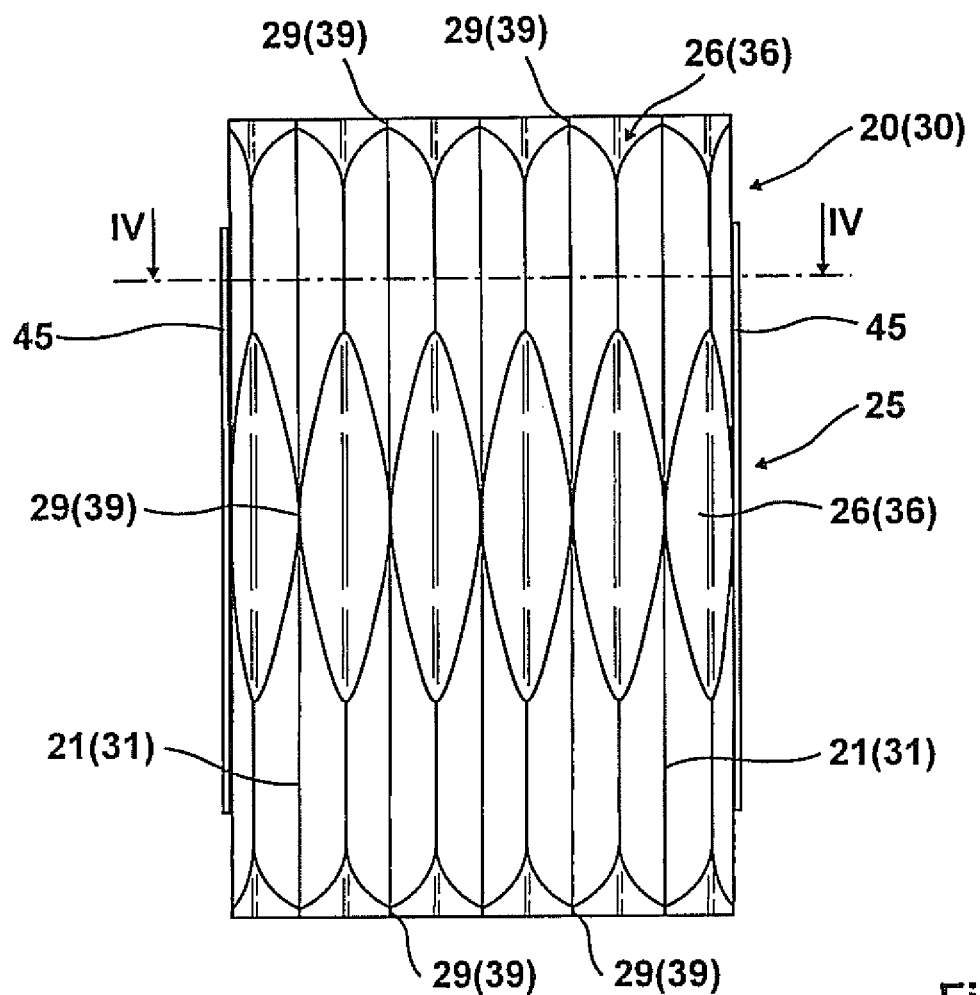
FIG. 3 shows a top view of that in FIG. 2.
Figure 4:
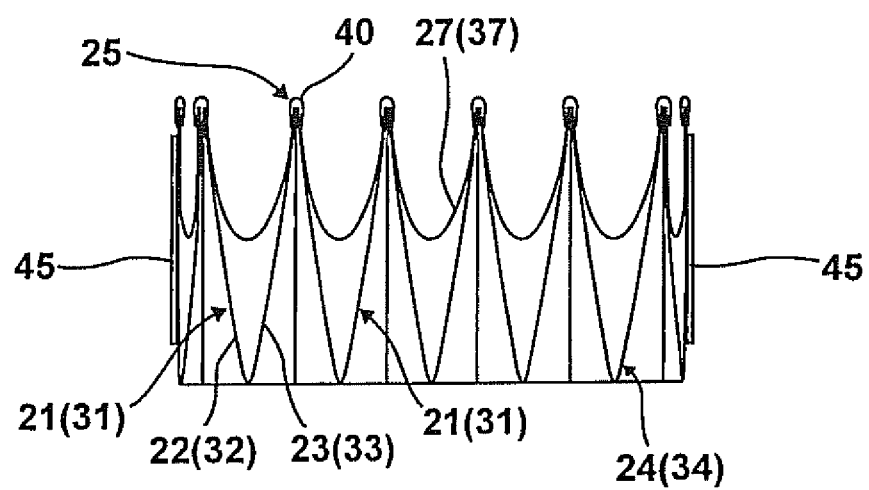
FIG. 4 shows a cross-section from FIG. 3 cut along the line IV-IV.

As can be seen in FIG. 2 as well as FIG. 3, a slit is provided in the middle of the side panel 20 or bellows 30 in the region of the spine 24, 34 of the pleat 21, 31 running along the pleat, wherein in the region of the slit 26, 36, the pleat wall 22, 32 is attached to the pleat wall 23, 33 of the respective adjacent pleat by a seam 29, 39 running up the height of the pleat wall. For this, the slit 26, 36 is spread open, as can be seen in FIG. 2 or FIG. 3. The respective corrugation element runs in the slit. In both a side panel as well as a bellows, the individual pleats are also slit open at the vertical ends (slits 26a, 36a), whereby in this region as well, as previously described, the pleat walls 22, 32 are connected to the adjacent pleat walls 23, 33 by a corresponding seam 29, 39. A pleat is understood to mean a pleat that receives a corrugation element. It should be noted at this point that with a bellows 30, in particular one of this type, a slit in the corner region provides for a high degree of expansion, which is necessary for accommodating rolling and pitched movements.

Figure 5:
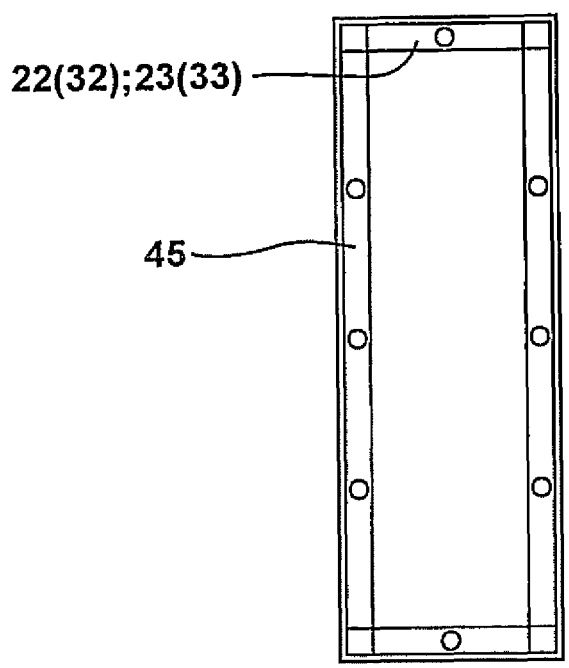
FIG. 5 shows a view from the perspective of the line V-V in FIG. 2.

FIG. 5 shows a cross section cut along the line V-V in FIG. 2, wherein the last pleat 22, 32 or 23, 33 respectively, has a rectangular frame 45, which encompasses the pleat wall, and it is by means of this frame that the bellows 30 or the side panel is attached to the end surface of the vehicle (not shown). The high degree of rigidity is obtained, in particular, as a result of the full-surface connection of the side panel or bellows in the region of the last pleat to the end surface of the carriage body.

The invention claimed is:

1. A bellows for a passage or a side panel for extending between two vehicles joined in an articulated manner, the bellows or side panel comprising:
   a plurality of adjacent pleats each having two pleat walls joined by a pleat crease, each pleat wall extending from the pleat crease to an end, the plurality of pleats having an inner surface and an outer surface;
   a corrugation element disposed in each pleat, each corrugation element having a pair of ends;
   the ends of each corrugation element being connected to the respective ends of each pleat; and
   at least some of the pleats having a slit in the region of the crease;

wherein in the region of the slit, the pleat walls of two adjacent pleats are connected to one another.

2. A bellows or side panel in accordance with claim 1, wherein the ends of the pleats and ends of the corrugation elements are connected by a frame having a U-shaped cross section.

3. A bellows or side panel in accordance with claim 1, wherein the pleats and corrugation elements are formed of a reinforcement coated with an plastic.

4. A bellows or side panel in accordance with claim 3, wherein the reinforcement is a textile and the plastic is an elastomer.

5. A bellows or side panel in accordance with claim 1, wherein the connection of the pleat walls of adjacent pleats is formed by a seam which extends over a height of the pleats.

6. A bellows or side panel in accordance with claim 1, wherein one of the pleats is an end pleat, the end pleat being connected to one of the vehicles at a longitudinal edge of the end pleat.

7. A bellows or side panel in accordance with claim 1, wherein one of the pleats is an end pleat, the bellows or side panel further comprising a frame attached to the pleat wall of the end pleat for connecting the pleats to one of the vehicles.

8. A side panel in accordance with claim 1, wherein the side wall has an upper and lower end, the adjacent pleat walls of at least some of the pleats being interconnected by a seam at the upper and lower ends of the side wall.

9. A bellows in accordance with claim 1, wherein the bellows has a corner region, a slit being defined in at least some of the pleats in the corner region and in the region of the slits of the corner region, the pleat walls of two adjacent pleats are connected to one another by a seam.

* * * * *